US011487043B2

(12) United States Patent
Kageyama et al.

(10) Patent No.: US 11,487,043 B2
(45) Date of Patent: Nov. 1, 2022

(54) X-RAY IMAGE GENERATION DEVICE

(71) Applicant: Rigaku Corporation, Tokyo (JP)

(72) Inventors: Masashi Kageyama, Tokyo (JP); Kenichi Okajima, Tokyo (JP); Kouichi Katou, Tokyo (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 17/338,293

(22) Filed: Jun. 3, 2021

(65) Prior Publication Data
US 2021/0382196 A1 Dec. 9, 2021

(30) Foreign Application Priority Data
Jun. 3, 2020 (JP) .............................. JP2020-096569

(51) Int. Cl.
*G01N 23/041* (2018.01)
*G01V 5/00* (2006.01)
(52) U.S. Cl.
CPC .................. *G01V 5/0016* (2013.01)
(58) Field of Classification Search
CPC .. G01V 5/0016; G01N 23/041; G01N 23/046; G01N 23/20075
See application file for complete search history.

(56) References Cited

U.S. PATENT DOCUMENTS

| | | | |
|---|---|---|---|
| 7,889,838 B2 | 2/2011 | David et al. | |
| 9,597,050 B2 | 3/2017 | Roessl et al. | |
| 10,481,110 B2 | 11/2019 | Momose et al. | |
| 10,533,957 B2 | 1/2020 | Momose et al. | |
| 11,162,908 B2 * | 11/2021 | Mizoguchi | G01N 23/083 |
| 2015/0036795 A1 * | 2/2015 | Roessl | A61B 6/06 378/36 |

FOREIGN PATENT DOCUMENTS

JP 2012-16370 A 1/2012

OTHER PUBLICATIONS

Kottler, C. et al., "Grating interferometer based scanning setup for hard x-ray phase contrast imaging", Review of Scientific Instruments, 78, 043710, 2007, 5 pgs.

(Continued)

*Primary Examiner* — David P Porta
*Assistant Examiner* — Mamadou Faye
(74) *Attorney, Agent, or Firm* — Seed Intellectual Property Law Group LLP

(57) ABSTRACT

An X-ray image generation device includes a moving mechanism that moves an object relative to a grating part in a direction crossing X-rays emitted toward the grating part. The grating part includes N (2≤N) regions along the direction of movement by the moving mechanism. A cyclic direction of a grating structure in each of the plurality of gratings belonging to an ith (1≤i≤N−1) region out of the N regions and a cyclic direction of a grating structure in each of the plurality of gratings belonging to an (i+1)th region out of the N regions are different directions. The plurality of gratings are configured so that moiré interference fringes generated in the N regions have a cyclic intensity fluctuation measurable by the detector and of at least one cycle or more in the direction of movement by the moving mechanism.

5 Claims, 10 Drawing Sheets

(56) References Cited

OTHER PUBLICATIONS

Sharma, Y. et al., "Trochoidal X-ray Vector Radiography: Directional dark-field without grating stepping", Applied Physics Letters (Appl. Phys. Lett.) 112, 111902, 2018, 6 pgs.
Kageyama, M. et al., "X-ray phase-imaging scanner with tiled bent gratings for large-field-of-view nondestructive testing", NDT and E International, 105, 2019, pp. 19-24.
Sharma, Y. et al., "Design of Acquisition Schemes and Setup Geometry for Anisotropic X-ray Dark-Field Tomography (AXDT)", Scientific Reports, vol. 7, Article No. 3195, 2017, 10 pgs.

* cited by examiner

X-RAY IMAGE GENERATION DEVICE

BACKGROUND

Technical Field

The present disclosure relates to a technique for observing an internal structure of a sample (object) with high sensitivity by utilizing properties of X-rays transmitted through the sample as waves.

Description of the Related Art

X-rays are widely used as probes for viewing the inside of an object in medical image diagnosis, nondestructive inspection, security check, and the like. The contrast of an X-ray fluoroscopic image depends on the difference in X-ray attenuation rate, and an object which strongly absorbs X-rays is depicted as a shadow of X-rays. The X-ray absorptivity becomes stronger as the object contains a greater amount of elements with a high atomic number. Conversely, it can be pointed out that contrast is difficult to obtain for a material made of elements with a small atomic number, which is a principal disadvantage of conventional X-ray fluoroscopic images. Therefore, for biological soft tissues, organic materials, or the like, sufficient sensitivity cannot be obtained.

On the other hand, by utilizing the properties as waves in X-rays, it is possible to achieve high sensitivity of about three digits at the maximum as compared to a general conventional X-ray fluoroscopic image. Hereinafter, this is referred to as a phase-contrast X-ray imaging. If this technique is applied to the observation of materials (biological soft tissues, organic materials, etc.) made of light elements that do not absorb much X-rays, it will become possible to conduct examinations that have been difficult to conduct by conventional methods, and hence practical application of it is expected. That is, phase-contrast X-ray imaging is used, for example, to enhance the contrast of a low-absorbency sample as compared to that of a conventional absorption contrast image.

U.S. Pat. No. 7,889,838 discloses an X-ray interferometer device having, in addition to an image detector, a multicolor X-ray source, an X-ray interferometer, a source grating (so-called G0 grating), a phase grating (so-called G1 grating), and an analysis grating (so-called G2 grating). An object is disposed between the source grating and the phase grating. Each of these gratings is configured to have a plurality of X-ray transmission slits between a plurality of bladders (cyclically arranged grating members) made of an absorbing material such as gold. According to this technique, a phase contrast image can be shot while multicolor X-rays are used. However, this X-ray interferometer device provides phase-contrast information in only one particular direction.

Meanwhile, U.S. Pat. No. 9,597,050 discloses an X-ray interferometer device provided with a plurality of grating portions having different cyclic directions. In this technique, a plurality of regions offset by a 1/n cycle (n≤2) is provided in each of the plurality of grating portions, respectively. Then, X-ray imaging is performed, while an object moves in the respective regions of the plurality of grating portions, to acquire pieces of phase-contrast information in a plurality of directions.

However, this technique requires at least eight line-detectors, and the line-detectors need to be disposed in specified association with the respective grating portions and regions. Thus, this technique not only increases the number of components but also requires precise positioning between a plurality of components. Hence there is a problem that actual manufacturing cost and operational cost increase.

REVIEW OF SCIENTIFIC INSTRUMENTS 78, 0437102007 describes an imaging technique eliminating the need for the 1/n-cycle offset of the phase grating described above. This technique is a method in which, based on the assumption that moiré interference fringes generated by transmission through an X-ray interferometer are ideally disposed at equal intervals, a fringe scanning method is achieved by moving an object relatively to the interference fringes.

U.S. patent Ser. No. 10/481,110 discloses a method in which even when non-ideal moiré interference fringes are used, the fringe scanning method can be achieved by moving an object relatively to the interference fringes.

U.S. patent Ser. No. 10/533,957 describes a technique for achieving fringe scanning by shooting a moving image while moving a grating.

However, REVIEW OF SCIENTIFIC INSTRUMENTS, 78, 043710 (2007), U.S. patent Ser. No. 10/481,110, and U.S. patent Ser. No. 10/533,957 describe the above present solutions for the complicated and precise positioning of the components and can only acquire phase-contrast information in one direction.

Applied Physics Letters (Appl. Phys. Lett.) 112, 111902 (2018) describes a method for acquiring pieces of information in a plurality of directions by using an X-ray interferometer device provided with a grating having one cyclic direction. This device has a mechanism for rotating an object with respect to a grating in addition to a moving mechanism for the object and simultaneously move and shoot the object to acquire pieces of information in a plurality of directions.

According to this method, it is possible to avoid the complicated and precise positioning of components. However, in this method, the region through which X-rays are transmitted changes for each rotational angle of the object, and it is thus impossible to superimpose pieces of information in a plurality of directions for a certain region in a strict sense.

Further, since this method requires rotating the object, even when the original field of view of the imaging device is rectangular, the substantial field of view is limited to a circle having a diameter that is the same as the length in the direction of the minor axis of the rectangle.

Moreover, Scientific Reports, volume 7, Article number: 3195 (2017), describes a method for acquiring pieces of three-dimensional information in a plurality of directions by using an X-ray interferometer device provided with a grating in one direction. This device is an X-ray computerized tomography (CT) device having a mechanism for rotating a direction of an object with respect to a grating and performs CT by a conventional fringe scanning method and the rotation of the object in a plurality of directions. However, this technique has a problem that the size of the object is limited because the field of view is limited by the grating or the rotation mechanism.

These references, namely U.S. Pat. Nos. 7,889,838, 9,597, 050, U.S. patent Ser. No. 10/481,110, U.S. patent Ser. No. 10/533,957, REVIEW OF SCIENTIFIC INSTRUMENTS, 78, 043710 (2007), Applied Physics Letters (Appl. Phys. Lett.) 112, 111902 (2018), and Scientific Reports, volume 7, Article number: 3195 (2017), are incorporated herein by reference.

The present disclosure has been made in view of the above circumstances. The present disclosure provides a technique for facilitating the acquisition of pieces of phase-contrast information in a large field of view and in a plurality of directions.

BRIEF SUMMARY

Aspects of the present disclosure can be described by the following items.

Item 1

An X-ray image generation device for generating an X-ray image of an object by using an X-ray intensity distribution image, the device including: a source; a grating part; a detector; and a moving mechanism. The source is configured to emit X-rays toward the grating part. The grating part includes a plurality of gratings constituting a Talbot interferometer. The detector is configured to detect the X-rays having passed through the grating part as the X-ray intensity distribution image. The moving mechanism is configured to move the object relatively to the grating part in a direction crossing the X-rays emitted toward the grating part. The grating part includes N (2≤N) regions arranged in a direction along the direction of the movement by the moving mechanism. A cyclic direction of a grating structure in each of the plurality of gratings belonging to an ith (1≤i≤N−1) region out of the N regions and a cyclic direction of a grating structure in each of the plurality of gratings belonging to an (i+1)th region out of the N regions are different directions. The plurality of gratings are configured so that moiré interference fringes generated in each of all the N regions have a cyclic intensity fluctuation measurable by the detector and have a cyclic intensity fluctuation of at least one cycle or more in the direction of the movement by the moving mechanism.

Item 2

The X-ray image generation device according to Item 1, in which the plurality of gratings include a G1 grating and a G2 grating constituting a Talbot interferometer, and the cyclic directions in the N regions of the G2 grating are set to uniformly rotate at an angle θ (θ≠0) with respect to a self-image, generated by the G1 grating of the grating part and having N cyclic directions, to generate the moiré interference fringes.

Item 3

The X-ray image generation device according to Item 2, in which the angle θ satisfies the following range in all the N regions:

$$\frac{d}{l_i \cos\psi_i} < |\theta| < \frac{d}{3p\cos\psi_i} \quad (1)$$

where
 d is a grating cycle of the G2 grating;
 $l_i$ is a width of an image detection region on the detector in a movement direction of the object in the ith region out of the N regions;
 $\psi_i$ is an angle in the cyclic direction in the self-image generated by the G1 grating (a direction parallel to the object movement direction is assumed to be 0°) in the ith region out of the N regions; and
 p is a pixel size of the detector.

Item 4

The X-ray image generation device according to Item 3, in which the width $l_1$ of the image detection region satisfies the following range in all the N regions:

$$l_i = L \frac{\frac{1}{\cos\psi_i}}{\sum_{i=1}^{N} \frac{1}{\cos\psi_i}} \quad (3)$$

where L is a total width of the image detection region on the detector in the movement direction of the object for all the N regions.

Item 5

The X-ray image generation device according to any one of Items 1 to 4, in which each of the plurality of gratings has the grating structure in different cyclic directions formed on one substrate.

Item 6

The X-ray image generation device according to any one of Items 1 to 5, in which the plurality of gratings further include a G0 grating constituting a Talbot-Lau interferometer.

Item 7

The X-ray image generation device according to any one of Items 1 to 6 further including a processing unit. The processing unit includes an X-ray image generation unit and an artifact processing unit. The X-ray image generation unit is configured to generate an X-ray image by using a plurality of intensity distribution images acquired by the detector. The artifact processing unit is configured to remove an artifact in the X-ray image by using a region of interest (ROI) image in a region where there is no object in the X-ray image.

Advantageous Effect of Disclosure

According to the present disclosure, it is possible to provide a technique that facilitates the acquisition of pieces of phase-contrast information in a plurality of directions in a large field of view.

BRIEF DESCRIPTION OF THE SEVERAL VIEWS OF THE DRAWINGS

FIG. 1 is viewed from a cut plane along a plane including a conveyance direction of an object and a radiation direction of X-rays;

DETAILED DESCRIPTION

A configuration of an X-ray image generation device according to one embodiment of the present disclosure (hereinafter referred to as a "generation device" or "device") will be described below with reference to the drawings. This device is a device for generating an X-ray image of an object by using an X-ray intensity distribution image.

Figure 1:
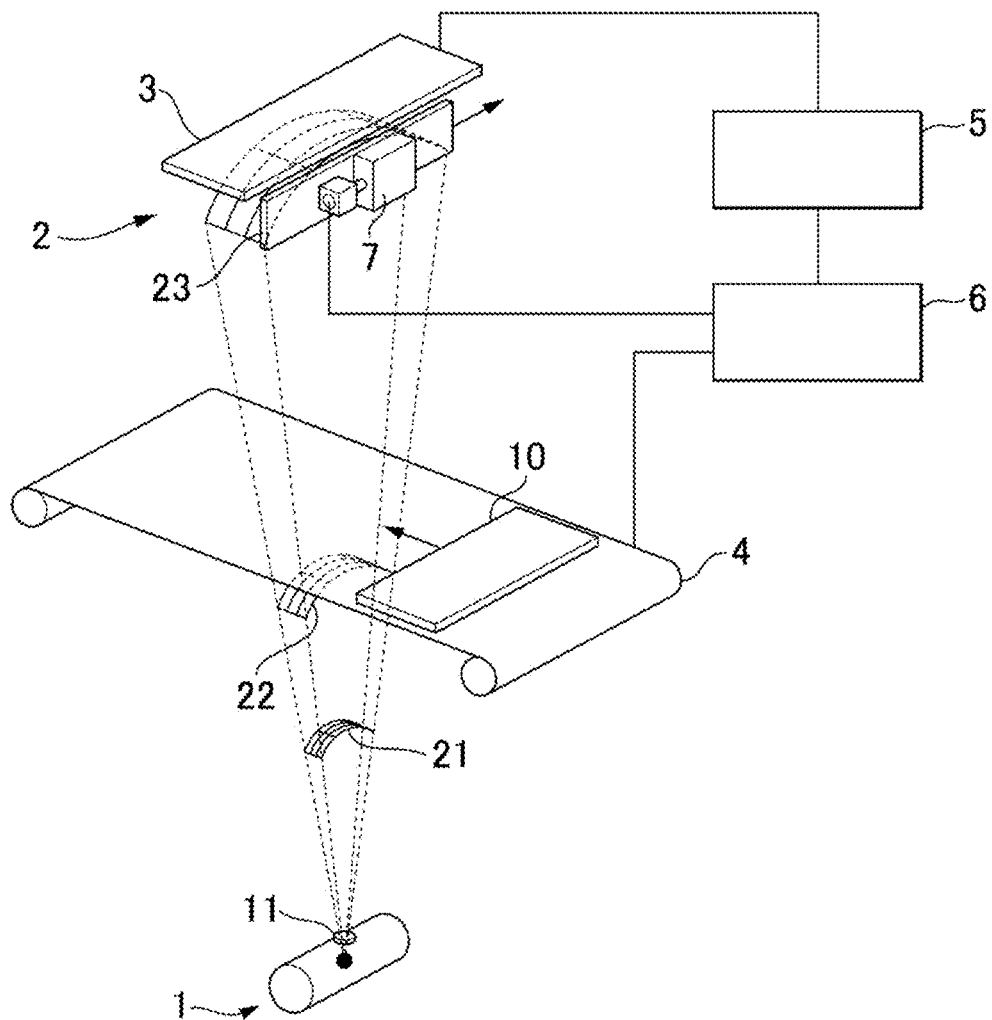
FIG. 1 is an explanatory view illustrating a schematic configuration of an X-ray image generation device according to one embodiment of the present disclosure.

As illustrated in FIG. 1, the generation device of the present embodiment includes a source 1, a grating part 2, a detector 3, and a moving mechanism 4. The device further includes a processing unit 5, a control unit 6, and a driving unit 7 as additional elements.

Source

Figure 2:
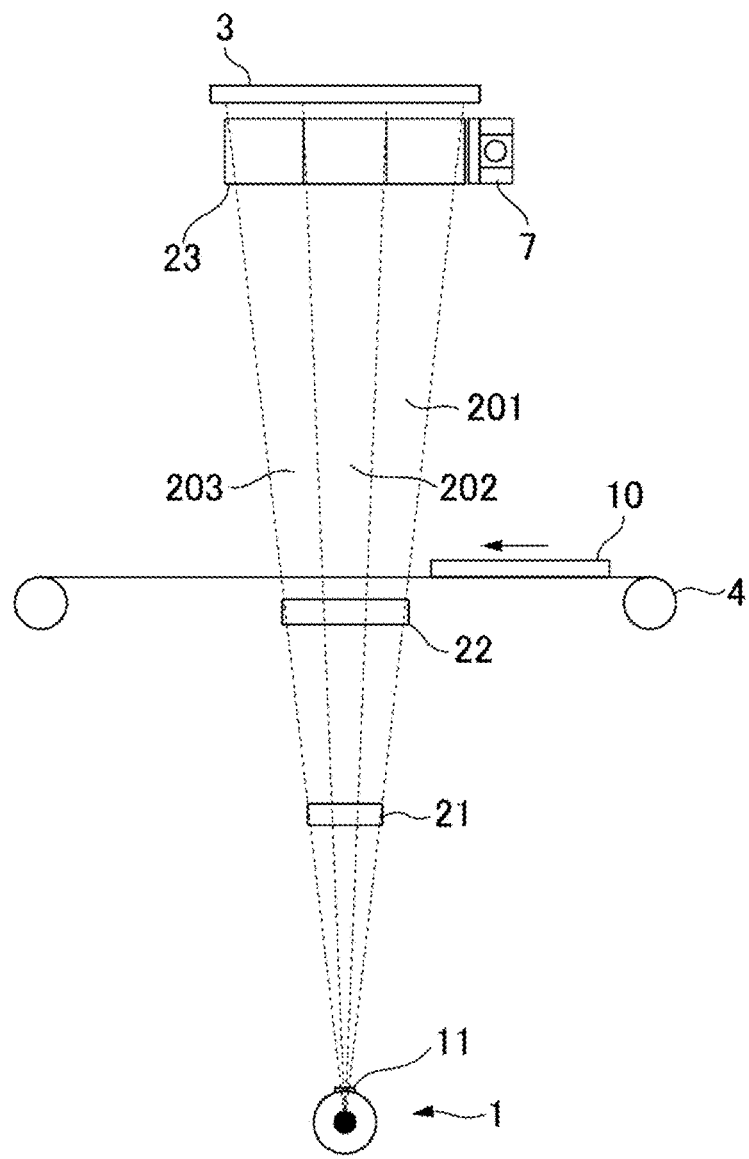
FIG. 2 is a schematic explanatory view of a main part of the X-ray image generation device of FIG. 1 in a state where

The source 1 is configured to emit X-rays having transparency to an object 10 from a window 11 (cf. FIG. 2) toward the grating part 2. The configuration of the source 1 may be basically the same as in the prior art, and hence further detailed description thereof will be omitted.

Grating Part

The grating part 2 includes a plurality of gratings constituting a Talbot interferometer. Specifically, the grating part 2 includes a G0 grating (so-called source grating) 21, a G1 grating (so-called phase grating) 22, and a G2 grating (so-called analyzer grating) 23. That is, the grating part 2 of the present embodiment further includes the G0 grating constituting a Talbot-Lau interferometer in addition to the G1 grating and the G2 grating constituting the Talbot interferometer.

The grating part 2 includes N regions (N is a natural number of two or more) arranged in a direction along the direction of the movement of the object 10 by the moving mechanism 4. Specifically, the grating part 2 of the present embodiment includes a first region 201, a second region 202, and a third region 203 (cf. FIG. 2). The number of regions only needs to be plural and may be four or more.

Figure 3:
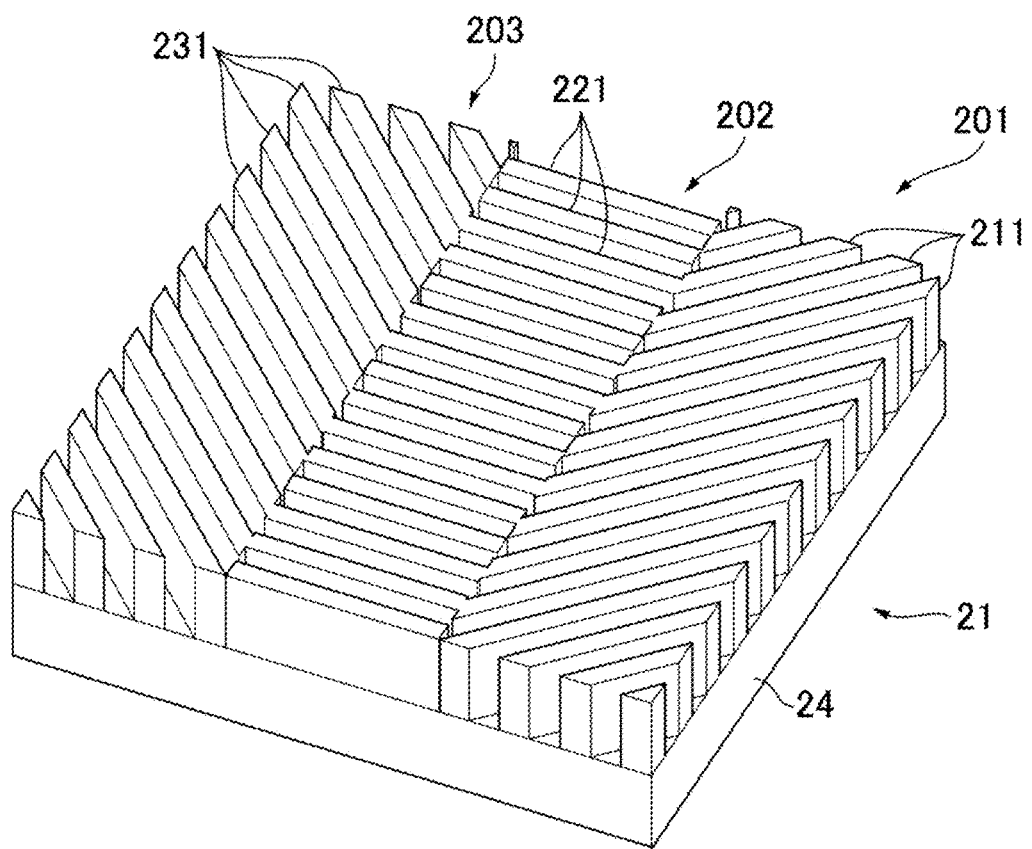
FIG. 3 is a perspective view for explaining a schematic structure of one grating constituting a grating part used in the device of FIG. 1.

Cyclic directions of adjacent grating structures in each of the plurality of gratings 21 to 23 belonging to the respective regions 201 to 203 are made different from each other. As a result, in the present embodiment, the cyclic direction of the grating structure in each of the plurality of gratings belonging to an ith ($1 \leq i \leq N-1$) region out of the N regions and the cyclic direction of the grating structure in each of the plurality of gratings belonging to an (i+1)th region out of the N regions are different directions. FIG. 3 illustrates an example of the G0 grating 21. In this grating, grating members 211, 221, 231 constituting grating structures in different cyclic directions are provided in accordance with the three regions 201 to 203. In the other gratings as well, each of the same regions 201 to 203 has the grating structure in the same cyclic direction, and different regions have different cyclic directions.

Figure 4A:
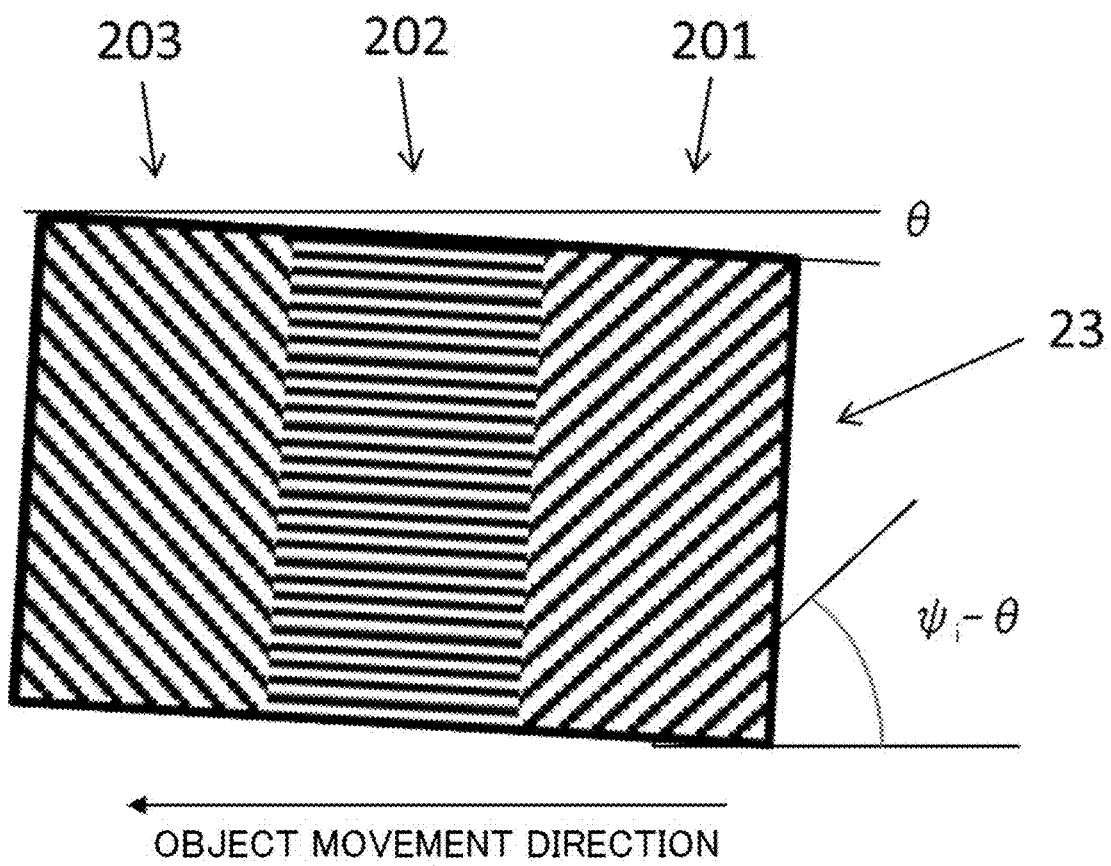
FIG. 4A is an explanatory view for explaining the rotational state of the grating.

In order to generate "moiré interference fringes having an intensity fluctuation of at least one cycle or more in the direction of the movement by the moving mechanism 4 and having the intensity fluctuation measurable by the detector 3," at least one of the plurality of gratings 21 to 23 (e.g., G2 grating 23) is "rotated and disposed at an angle θ with respect to a self-image, generated by the G1 grating 22, in a position where the grating is to be disposed for constituting the Talbot interferometer" (cf. FIG. 4A). However, θ≠0.

More specifically, the angle θ(rad) in the present embodiment is set within the following range:

$$\frac{d}{l_i \cos\psi_i} < |\theta| < \frac{d}{3p\cos\psi_i} \quad (1)$$

where d is a grating cycle of the G2 grating;

$l_i$ is a width of an image detection region on the detector in the movement direction of the object in the ith region out of the N regions;

$\psi_i$ is an angle in the cyclic direction in the self-image generated by the G1 grating (a direction parallel to the object movement direction is assumed to be 0°) in the ith region out of the N regions; and p is a pixel size of the detector.

Note that the left term of the expression (1) means a condition in which an intensity fluctuation cycle, generated by the rotational moiré interference fringes in the direction of the movement by the moving mechanism 4, can be observed within the detection surface of the detector 3 for one cycle or more, and the right term means a condition in which the intensity fluctuation cycle has a width of three pixels or more of the detector 3.

Here, the range that $\psi_i$ takes is:

$$|\psi_i| < \arccos\left(\frac{d}{\theta l_i}\right) \quad (2)$$

At this time, assuming that the amount of deviation from a design value among the orientation angles of the respective grating regions is $\delta\psi_i$, it is desirable to generate on a single substrate 24 such gratings 21 to 23 as to take the following expression:

MAX($\delta\psi_i$)−MIN($\delta\psi_i$)<2d cos $\psi_i$

For example, when d=5 μm, l=10 mm, ψ=45°, and p=100 μm, the rotational angle θ(rad) of any one of the gratings 21 to 23 is within the following range:

0.00071 rad<|θ|<0.024 rad

Further, $l_i$ may be set to satisfy the following conditions for $$l_i = L \frac{\frac{1}{\cos\psi_i}}{\sum_{i=1}^{N} \frac{1}{\cos\psi_i}} \quad (3)$$

where L is the total width of the image detection region on the detector in the movement direction of the object for all the N regions.

Note that the expression (3) is a condition in which the same number of intensity fluctuation cycles, generated by the rotational moiré interference fringes in the direction of the movement by the moving mechanism 4, are generated in all the N regions within the detection surface of the detector 3 regardless of $\psi_i$. As a result, the left term of the expression (1) takes a constant value in all the N regions without depending on $\psi_i$, thereby simplifying the adjustment of the gratings.

Figure 4B:
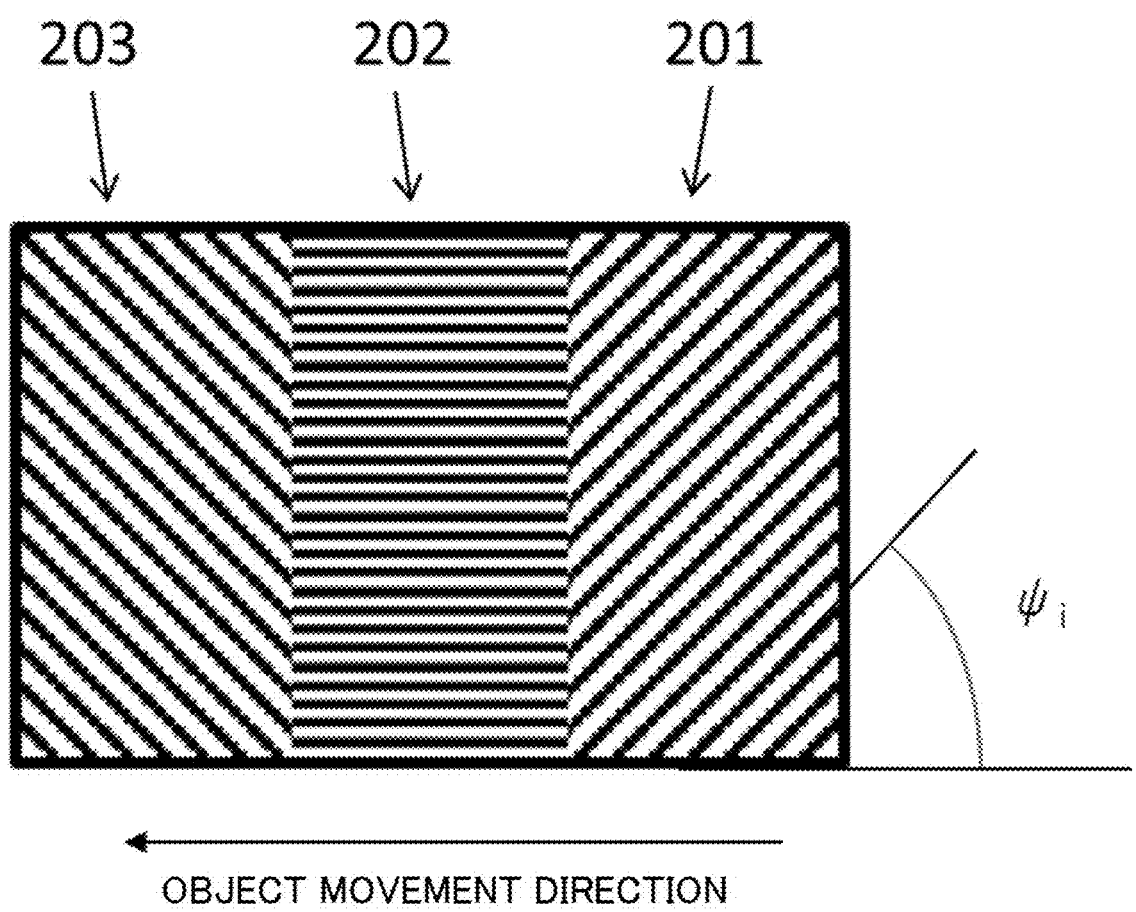
FIG. 4B is an explanatory view for explaining a self-image generated by a G1 grating.

Here, FIG. 4B illustrates how to take $\psi_i$ in the self-image generated by the G1 grating 22. In FIG. 4B, the angle in the cyclic direction in the region 201 at the right end in the figure is denoted as $\psi_i$.

The grating part 2 of the present embodiment satisfies the conditions for the mechanical structure and geometric arrangement necessary for constituting the Talbot interferometer (including the Talbot-Lau interferometer). However, in the present embodiment, the conditions for constituting the Talbot interferometer only need to be satisfied to a sufficient degree in order to enable the necessary inspection, and the conditions do not need to be satisfied in a mathematically strict sense.

The G0 grating 21 is a grating for constituting the Talbot-Lau interferometer which is a kind of the Talbot interferometer, and an absorption-type grating is used. The G0 grating achieves a microscopic light source array that is a component of the Talbot-Lau interferometer. The G1 grating is usually a phase-type grating but may be an absorption-type grating. The absorption-type grating is used as the G2 grating 23.

The G0 to G2 gratings 21 to 23 each includes the plurality of grating members 211, 221, 231, disposed at fixed cycles determined to constitute the Talbot interferometer, and a substrate 24 that supports these grating members (cf. FIG. 3). Thereby, each of the gratings 21 to 23 in the present embodiment has grating structures in different cyclic directions formed on one substrate 24. The fixed cycles of the grating members are calculated geometrically to constitute the Talbot-Lau interferometer, and the fixed cycles of the grating members 211, 221, 231 in the same grating (i.e., erected on the same substrate 24) are the same.

In the present embodiment, the grating members belonging to the first region 201 are arranged in a first direction, the grating members belonging to the second region 202 are arranged in a second direction, the grating members belonging to the third region 203 are arranged in a third direction, and hence the respective grating members are arranged in different directions. Here, the first direction is a direction of −45° with respect to the direction of the movement of the object 10 by the moving mechanism 4, the second direction is a direction parallel to the direction of the movement of the object 10 by the moving mechanism 4, and the third direction is a direction of +45° with respect to the direction of the movement of the object 10 by the moving mechanism 4. In a case where any one of the gratings is rotated at the angle θ, the above angles are angles before rotation. The first to third directions do not need to have a relationship orthogonal to each other.

Figure 5:
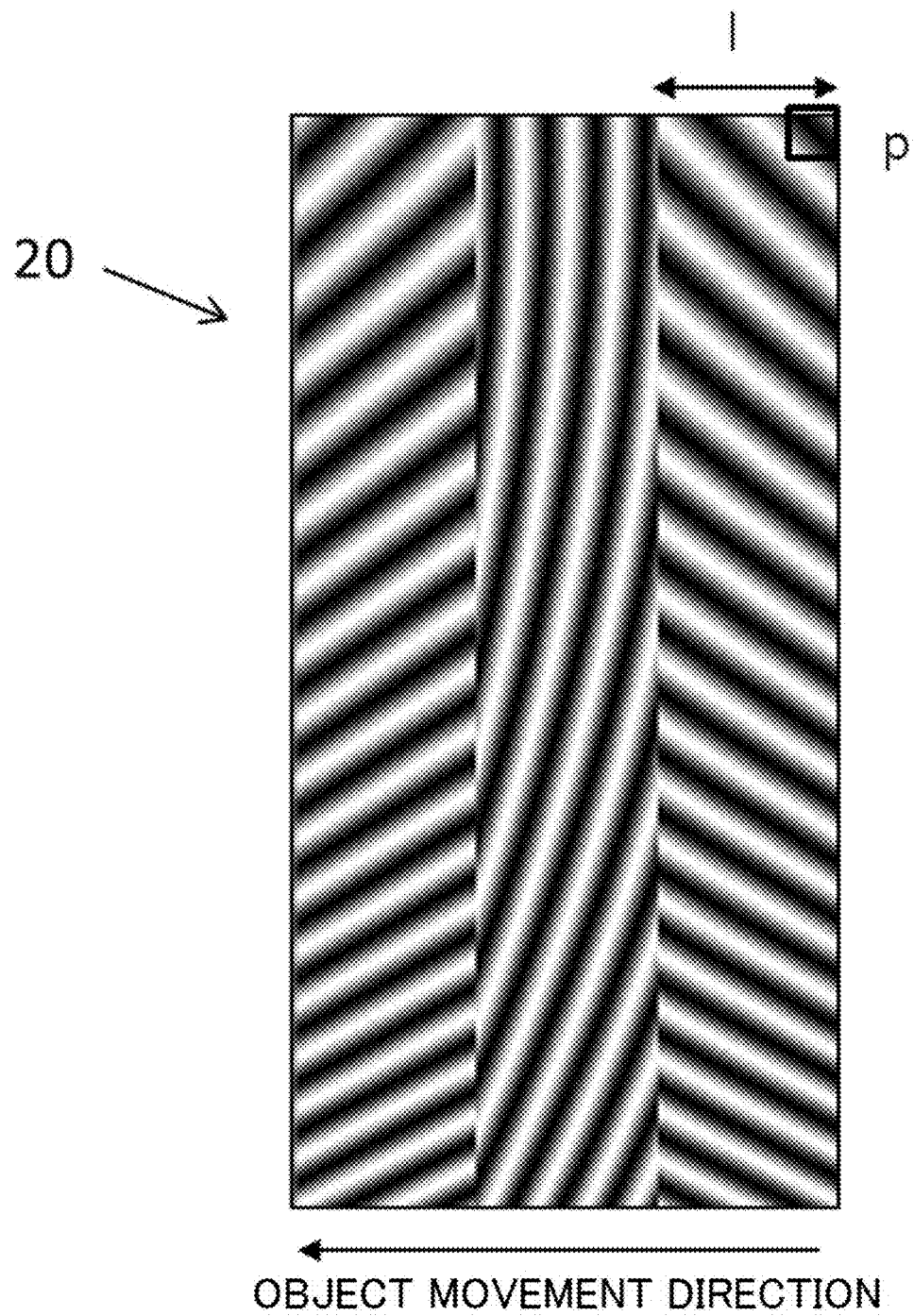
FIG. 5 is an explanatory view for explaining an example of moiré fringes generated by the grating part and detected by a detector.
Figure 6:
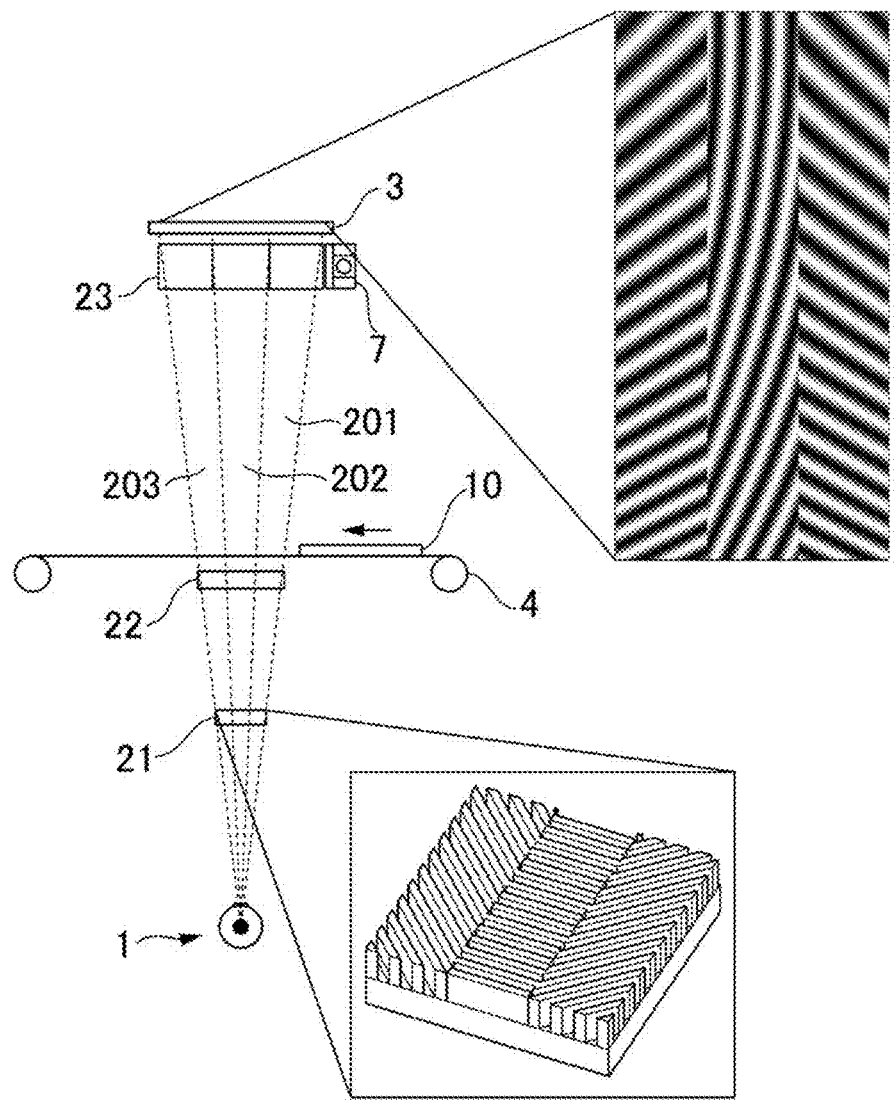
FIG. 6 is an explanatory view with an enlarged view of the grating and an enlarged view of the moiré fringes added in FIG. 2 for reference.

FIG. 5 illustrates an example of moiré fringes 20 caused by X-rays transmitted through each region. The moiré fringes 20 are observed using the X-ray detector 3 (FIG. 6 schematically illustrates this state). At this time, it is desirable that the spatial frequency of the interference fringes be "1/(pixel size of detector 3×3) cycle/mm or less in the direction of the movement of the object 10 by the moving mechanism 4," and "within a range where an intensity change of one cycle or more can be observed in each partial region." In this example, for deviation from the strict interference condition, the G2 grating 23 is slightly inclined with respect to the self-image generated by X-ray projection, as in the above expression (1).

When |θ| in the expression (1) becomes excessively large, it becomes difficult for the detector to resolve the fringes, and it is thus desirable to set the cycle of the intensity change of the moiré fringes 20 within the range of 2 to ⅒ p. This leads to the generation of appropriate moiré fringes in each region (cf. FIG. 5). FIG. 5 also illustrates an example of a pixel size p of the detector 3 for reference.

The areas of the regions 201 to 203 in each of the G0 to G2 gratings 21 to 23 (the areas of the regions where the grating members 211, 221, 231 are disposed) can be determined in accordance with the position of each of the gratings 21 to 23 and the position of the source 1. However, the positions and the areas of the respective regions 201 to 203 can be changed so long as necessary interference conditions are satisfied. The areas of the respective regions 201 to 203 on one substrate 24 may be different from each other. For example, by selecting the length of each region in the movement direction of the object so as to be proportional to $l_i$ satisfying the expression (3), the number of cycles of intensity changes in each region becomes the same, which simplifies the adjustment of the gratings.

The G0 to G2 gratings 21 to 23 of the present embodiment are arranged concentrically around the source 1 so that the distance between each of the grating members 211 to 231 and the source 1 is constant (cf. FIG. 1).

Further, the plurality of G0 to G2 gratings 21 to 23 are arranged in a direction perpendicular to the translational direction of the object 10, thereby expanding the field of view by one grating or more.

Detector

The detector 3 is configured to detect X-rays having passed through the grating part 2 as an intensity distribution image for each pixel. Specifically, as the detector 3 of the present embodiment, there is used an X-ray camera capable of detecting an X-ray for each pixel on the detection surface extending in a direction perpendicular to a plane formed by the movement direction of the object 10 and the X-ray emission direction.

The detector 3 is configured to detect X-rays having passed through each of the first to third regions 201 to 203 in the grating part 2. Further, within the detection surface of the detector 3, there is a rectangular region made up of pixels of P×Q pixels, and the direction of the detector 3 is set so that the direction of the movement of the object 10 by the moving mechanism 4 is parallel to the P direction or the Q direction.

Moving Mechanism

The moving mechanism 4 is configured to move the object 10 relatively to the grating part 2 in a direction crossing X-rays emitted toward the grating part 2. Although the moving mechanism 4 of the present embodiment moves the object 10 with respect to the grating part 2, it is also possible to move the grating part 2 with respect to the object 10. The movement direction is not limited to be translational but may be rotational. For example, it is also possible to rotate devices such as the grating part 2, the source 1, and the detector 3 around the object 10.

Processing Unit

Figure 7:
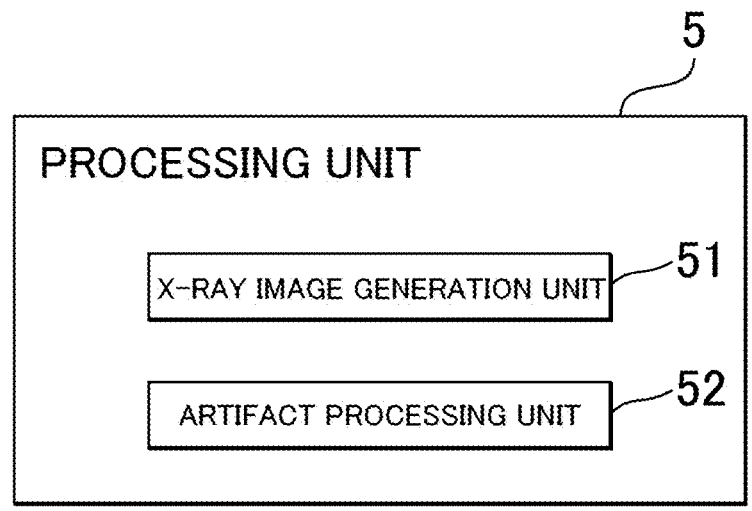
FIG. 7 is a block diagram for explaining an outline of a processing unit.

The processing unit 5 includes an X-ray image generation unit 51 and an artifact processing unit 52 (cf. FIG. 7).

The X-ray image generation unit 51 is configured to generate an X-ray image by using a plurality of intensity distribution images acquired by the detector 3. The artifact processing unit 52 is configured to remove an artifact in the generated X-ray image by using a ROI image in a region where the object 10 is not present in the X-ray image. The detailed operation of the processing unit 5 will be described later as an X-ray image generation method of the present embodiment.

Control Unit

The control unit 6 is configured to send a command to the moving mechanism 4 based on an instruction from the processing unit 5 to cause the object 10 to move at a necessary timing. The control unit 6 may be configured to receive feedback from the moving mechanism 4 and grasp the position of the object 10. The control unit 6 of the present embodiment also controls the operation of the driving unit 7 (described later).

Driving Unit

In the present embodiment, the driving unit 7 is configured to move the G2 grating 23 in the direction perpendicular to the plane formed by the movement direction of the object 10 and the X-ray emission direction. The driving unit 7 may be a suitable mechanism for translating the G2 grating 23, such as, but not limited to, a ball screw, a linear motor, a piezo element, or an electrostatic actuator. The driving unit 7 may be configured to move the G0 grating 21 or the G1 grating 22 instead of the G2 grating 23. The driving unit 7 of the present embodiment is configured to move the grating in a predetermined direction (e.g., forward movement direction or backward movement direction) at a predetermined timing in response to a command from the control unit 6.

X-Ray Image Generation Method of Present Embodiment

Next, a method for generating an X-ray image by using the device of the present embodiment will be described with further reference to FIG. 8.

Figure 8:
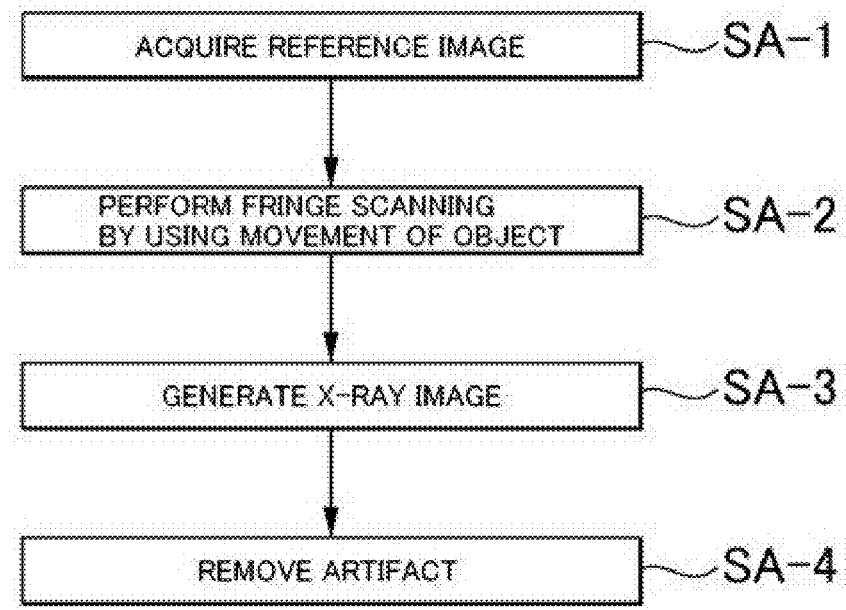
FIG. 8 is a flowchart for explaining an example of an X-ray image generation method using the device of FIG. 1.

Step SA-1 in FIG. 8

This step is for generating a reference image (a moiré image in a state where there is no object) by using the method of U.S. patent Ser. No. 10/533,957 described above.

First, in the state where there is no object, X-rays are emitted from the source 1 to the grating part 2. Thereby, interference fringes (moiré fringes) corresponding to each of the first to third regions 201 to 203 in the grating part 2 can be generated (cf. FIG. 5).

In this state, the driving unit 7 continuously moves any one of the gratings (the G2 grating in the present embodiment) at a constant speed. Thus, the interference fringes can be changed continuously.

In parallel with this operation, a continuous change in the interference fringes is continuously shot (i.e., as a moving image) by the detector 3.

Here, the amount of movement of the grating by the driving unit 7 is set to be at least one cycle or more for the interference fringes in each of the first to third regions 201 to 203.

In general, the angle formed by the direction of the movement of the grating by the driving unit 7 and the grating direction (i.e., the cyclic direction of the grating) of each of the first to third regions 201 to 203 is different from region to region. Then, the amount of change in the interference fringes in each region due to the movement of the driving unit 7 is also different. Therefore, in the present embodiment, the procedure as described above is performed.

After the completion of the shooting performed while the interference fringes are changed, the driving unit 7 returns to the initial state. That is, the moved grating returns to its initial position.

Then, the processing unit 5 generates M images Ak (cf. U.S. patent Ser. No. 10/533,957), which are a set of discrete pixel values (changes) for each 1/M cycle, in each of the first to third regions 201 to 203 from a series of images of the interference fringes having changed continuously for one cycle or more.

From the discrete M interference fringe images, an average intensity distribution $A_0$ for pixel value normalization is created in each of the first to third regions 201 to 203.

Further, in the interference fringes generated on the detector 3, the distribution of a total value $Gk(q)$ of the number of pixels of a region corresponding to a kth region in "a region generated by dividing one cycle of change in the interference fringes along the direction parallel to the conveyance direction by the moving mechanism 4 into M equal parts" (corresponding to $Nk(y)$ in U.S. patent Ser. No. 10/481,110) is generated for each of the first region 201, the second region 202, and the third region 203.

The other methods are the same as those in U.S. patent Ser. No. 10/533,957 described above, and thus further detailed description thereof will be omitted.

Step SA-2 in FIG. 8

Next, substantial fringe scanning is performed while the object is moved by the moving mechanism 4. This method is the same as the method described in U.S. patent Ser. No. 10/481,110 described above. Note that the method of step SA-1 described above can be said to perform the generation of a phase map (i.e., reference image) in a state where there is no sample in U.S. patent Ser. No. 10/481,110 by using the method of U.S. patent Ser. No. 10/533,957.

In step SA-2, the object 10 moved by the moving mechanism 4 passes through the first region 201, the second region 202, and the third region 203 while moving translating relatively to the grating part 2 during the emission of X-rays from the source 1 (cf. FIG. 6). During this time, the detector 3 continuously measures the intensity of the X-rays transmitted through the grating part 2.

Assuming that the translation speed at this time is v and the intensity at the tth frame at a pixel position (p, q) on the detector 3 is I(p, q, t), the relative position of the object on the detector 3 is (p=x+vt, q=y), so that the intensity at the tth frame can be described as I(p−vt, q, t) with respect to the relative movement speed of the object 10 including the magnification.

Then, from $A_0(p, q)$ and $Gk(q)$ obtained in step SA-1, the intensity of the cyclic region corresponding to the k/Mth phase amount of the interference fringe at the pixel position (p, q) on the detector 3 can be expressed as:

$$Jk(p,q)=\Sigma[I(p-vt,q,t)/A_0(p,q)/Gk(q)]$$

Step SA-3 in FIG. 8

Accordingly, the processing unit 5 of the present embodiment can calculate the following in each of the first region 201, the second region 202, and the third region 203:

$$\text{Absorption image Abs}(p,q)=\Sigma Jk(p,q)$$

$$\text{Differential phase image } \phi(p,q)=\arg[\Sigma Jk(p,q)\exp(i2\pi k/n)]$$

$$\text{Visibility Image Vis}(p,q)=2|\Sigma Jk(p,q)\exp(i2\pi k/n)|/\text{Abs}(p,q)$$

The other methods are the same as those of the U.S. patent Ser. No. 10/481,110 described above, and hence further detailed description thereof will be omitted.

Step SA-4 in FIG. 8

Next, in the present embodiment, stripe-shaped artifact removal processing is performed on the visibility image of each region obtained here. This processing is performed by setting "each of regions where the object is not present near the shooting start position and near the shooting end position" as the ROI and using a pixel value in the ROI.

Here, in the state where the object 10 is not present, the visibility image intensity obtained in the first region 201 is denoted as Vis10, the visibility intensity obtained in the second region 202 is denoted as Vis20, and the visibility intensity obtained in the third region 203 is denoted as Vis30. Further, the respective visibility intensities in a state where the object 10 is present are denoted as Vis1, Vis2, and Vis3. Then, the scattering intensities in the respective regions can be calculated as $$S1=-\ln(Vis1/Vis10)$$

$$S2=-\ln(Vis2/Vis20)$$

$$S3=-\ln(Vis3/Vis30)$$

By designating the region where the object 10 is not present as the ROI, an artifact can be removed using the above calculation. Specific setting methods and calculation methods of the ROI will be described in embodiment examples 1-3 below.

Acquisition of Orientation Degree Information

Based on the above consideration, the following can be obtained:

Omnidirectional scattering component distribution
$S_{all}=(S2+S3)/2$

Anisotropic component distribution $S_{aniso}=\sqrt{((S1-S_{all})^2+(S2-S_{all})^2)}$ Orientation degree Orientation=$S_{aniso}/S_{all}$ Principal orientation direction distribution
$\theta_{main}=0.5*a\tan 2(2(S1-S_{all}),2(S2-S_{all}))$ The calculation can be performed by the processing unit 5.

In the present embodiment, pieces of phase-contrast information in a plurality of directions can be acquired as described above. In the prior art, due to the need for rotating the sample, there has been a problem that the field of view becomes narrow and the device configuration becomes complicated. On the other hand, in the technique of the present embodiment, since pieces of phase-contrast information in a plurality of directions can be obtained without rotating the sample, there is an advantage that not only the device configuration is simplified, but also a wide field of view can be obtained.

Further, in the present embodiment, since any one of the gratings is rotated by the angle θ, there is an advantage that moiré fringes appropriate for generating an X-ray image can be reliably generated in each region.

Moreover, in the present embodiment, since the grating members 211, 221, 231 are erected on the substrate 24, it is possible to facilitate the installation work of the gratings 21 to 23 in the device as compared to a case where the grating members 211, 221, 231 are separately configured and disposed.

When the grating members 211, 221, 231 are separately configured and installed in the device, a gap is generated between the grating members, and the grating becomes wide at a fan angle. On the other hand, in the present embodiment, with the grating members 211, 221, 231 being erected on the substrate 24, the gap between the grating members 211, 221, 231 can be minimized (preferably 0), and the spread of the fan angle can be prevented. This makes it possible to prevent unnecessary X-ray emission.

In the present embodiment, the artifact removal processing can be omitted.

Embodiment Example 1

Next, a method for the artifact removal processing according to the embodiment example 1 of the present embodiment will be described with further reference to FIGS. 9A and 9B. In the description of the embodiment example 1, the description of elements that are basically common to the method of the one embodiment described above will be omitted by using the same reference numerals.

Figures 9A, 9B:
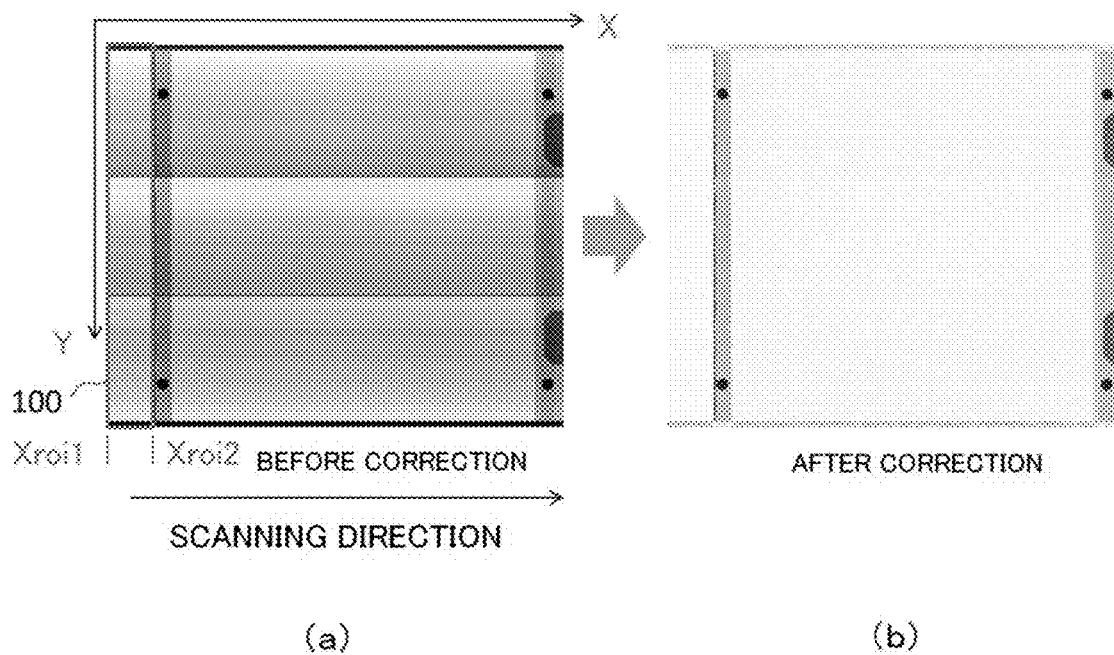
FIGS. 9A and 9B are explanatory views for explaining an artifact removal method according to an embodiment example 1, illustrating examples of an X-ray image before correction and after correction, respectively.

In the present embodiment example, first, the pixel value in the obtained image is set to I(x, y). Then, the following method is used:

(1) A rectangular region 100 where no object is present (cf. a thick line in FIG. 9A) is set, and both ends of the X coordinate of the region are denoted as $X_{roi}1$ and $X_{roi}2$ (FIG. 9A).

(2 By $I_{bg}(y)=(1/(X_{roi}2-X_{roi}1+1))\Sigma I(x, y)$, an average value of pixel values between $X_{roi}1$ and $X_{roi}2$ is obtained for each Y coordinate.

(3) Corrections are made for absorption and scatter images by:

$$I_{off}(x,y)=I(x,y)/I_{bg}(y),$$

and for a refracted image by:

$$I_{off}(x,y)=I(x,y)-I_{bg}(y).$$

Thus, an artifact can be removed (cf. FIG. 9B).

Embodiment Example 2

Next, a method for the artifact removal processing according to the embodiment example 2 will be described with further reference to FIGS. 10A and 10B. In the description of the embodiment example 2, the description of elements that are basically common to the method of the embodiment example 1 described above will be omitted by using the same reference numerals.

In the present embodiment example, the following method is used. The pixel value in the obtained image is set to I(x, y).

(1) Rectangular regions 101, 102 (cf. thick lines in FIG. 10A) in which the object 10 is not present are set at two locations, near a scanning start point and near a scanning end point. Here, the X coordinate ends of the rectangular region are $X_{roi}11$ and $X_{roi}12$ near the scanning start point, and $X_{roi}21$ and $X_{roi}22$ near the scanning end point.

(2) Then, the average of each of the two regions 101, 102 is obtained. Specifically, the following is calculated for each y:

$$I_{bg}1(y)=(1/(X_{roi}12-X_{roi}11+1))\Sigma I(x,y)$$

$$I_{bg}2(y)=(1/(X_{roi}22-X_{roi}21+1))\Sigma I(x,y)$$

(3) It is assumed that the pixel value changes linearly in the X direction between the two regions 101, 102.

$$I_{bg}(x,y)=I_{bg}1(y)+x*(I_{bg}2(y)-I_{bg}1(y))/(X_{roi}21-X_{roi}11+1)$$

(4) Each image can be corrected for absorption and scatter images by:

$$I_{off}(x,y)=I(x,y)/I_{bg}(x,y),$$

and for a refracted image by:

$$I_{off}(x,y)=I(x,y)-I_{bg}(x,y).$$

Figures 10A, 10B:
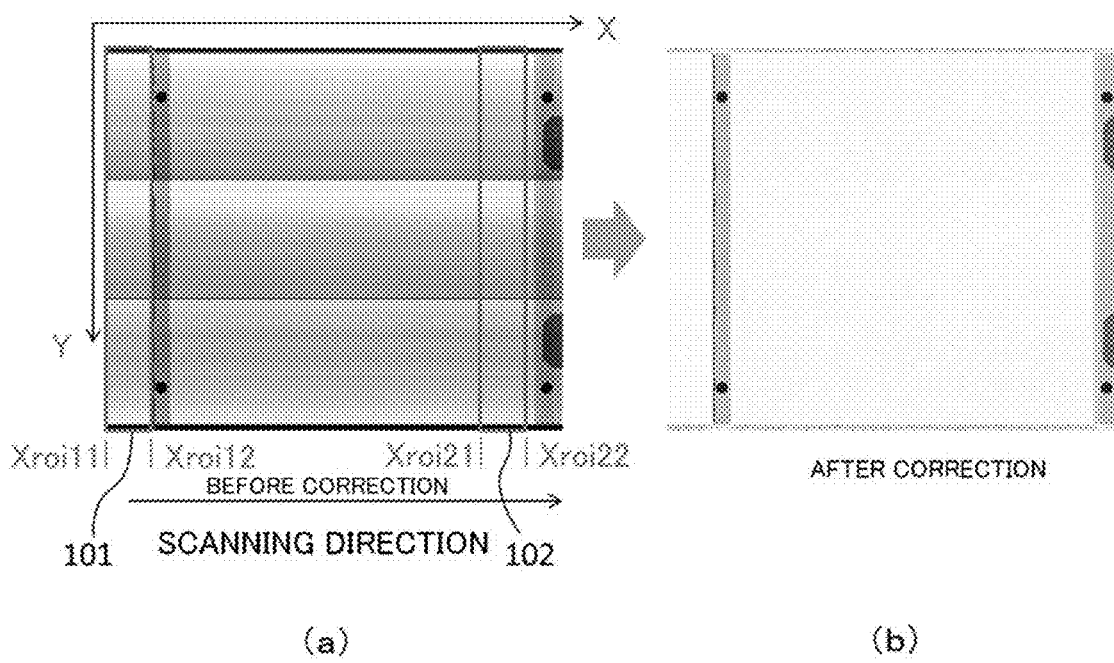
FIGS. 10A and 10B are explanatory views for explaining an artifact removal method according to an embodiment example 2, illustrating examples of an X-ray image before correction and after correction, respectively.

Thus, an artifact can be removed (cf. FIG. 10B).

Embodiment Example 3

Next, a method for the artifact removal processing according to the embodiment example 3 will be described with further reference to FIGS. 11A and 11B. In the description of the embodiment example 3, the description of elements that are basically common to the method of the embodiment example 1 described above will be omitted by using the same reference numerals.

In the present embodiment example, the following method is used.

(1) Shooting is performed in a state where there is no object. Next, a region (ROI) 103 (a thick line in FIG. 11A) on a straight line is set, and both ends in the X direction are designated as $X_{roi}1$ and $X_{roi}2$, respectively.

(2) The pixel values I(x, y) of the regions from $X_{roi}1$ to $X_{roi}2$ are fitted y by a quadratic function $Ax^2+Bx+C$ for each. That is, $I_{bg}(x, y)=A(y) x^2+B(y) x+C(y)$, and coefficients A(y), B(y), C(y) are determined for each y.

(3) Each image can be corrected for absorption and scatter images by:

$$I_{off}(x,y)=I(x,y)/I_{bg}(x,y),$$

and for a refracted image by:

$$I_{off}(x,y)=I(x,y)-I_{bg}(x,y).$$

Figures 11A, 11B:
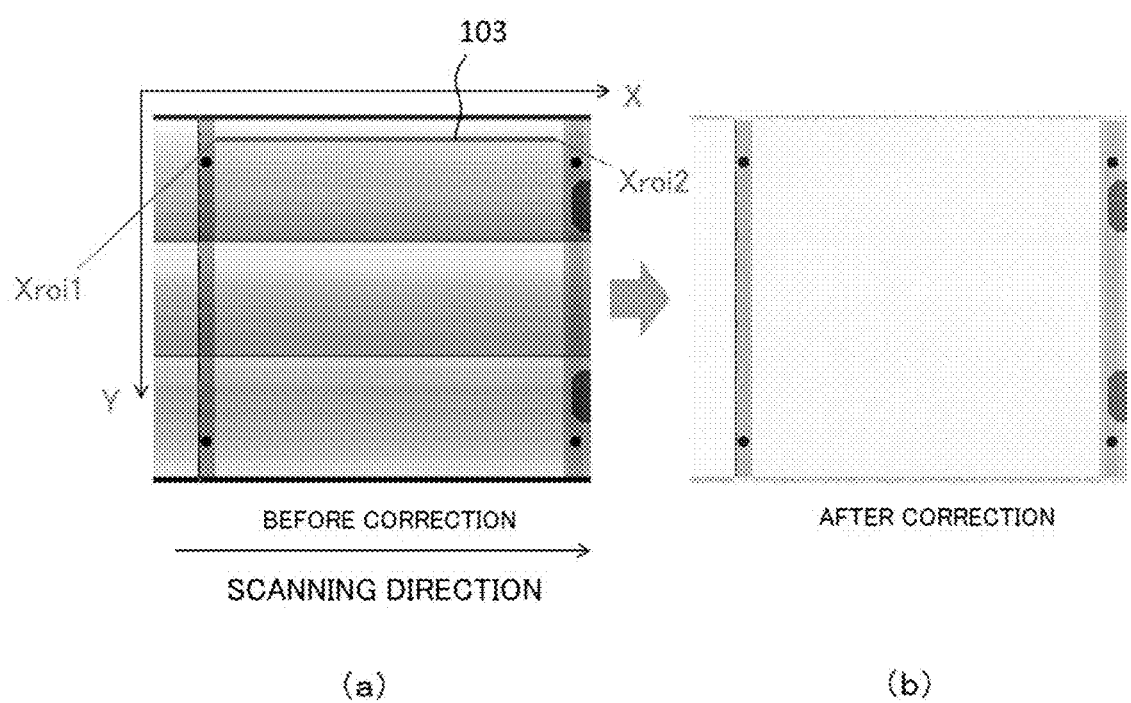
FIGS. 11A and 11B are explanatory views for explaining an artifact removal method according to an embodiment example 3, illustrating examples of an X-ray image before correction and after correction, respectively.

Thus, an artifact can be removed (cf. FIG. 11B).

Note that the description of the above embodiment and each of the embodiment examples is merely an example and does not show an essential configuration of the present disclosure. The configuration of each part is not limited to the above so long as the gist of the present disclosure can be achieved.

For example, a configuration in which a microscopic focus X-ray source is used and the G0 grating is omitted (i.e., a Talbot interferometer configuration) is also possible. In this case, the cyclic directions of the grating members only need to be made different for each region in the G1 grating and the G2 grating.

In the embodiment described above, the gratings have been formed concentrically around the source 1, but the gratings may be formed in a flat plate shape.

Further, in the present embodiment, each grating has been configured to have three cyclic directions so that anisotropy in three directions can be detected, but each grating may be configured to have two cyclic directions so that anisotropy in two directions can be detected.

REFERENCE SIGNS LIST

1 source
11 window
2 grating part
201 first region
202 second region
203 third region
21 G0 grating
211 grating member (grating structure)
22 G1 grating
221 grating member (grating structure)
23 G2 grating
231 grating member (grating structure)
24 substrate
3 detector
4 moving mechanism
5 processing unit
51 X-ray image generation unit
52 artifact processing unit
6 control unit
7 driving unit
10 object
20 moiré fringe
100, 101, 102, 103 region in image (ROI)

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An X-ray image generation device for generating an X-ray image of an object by using an X-ray intensity distribution image, the device comprising:
a source;
a grating part;
a detector; and
a moving mechanism, wherein:
the source is configured to emit X-rays toward the grating part,
the grating part includes a plurality of gratings constituting a Talbot interferometer,
the detector is configured to detect the X-rays having passed through the grating part as the X-ray intensity distribution image,
the moving mechanism is configured to move the object relative to the grating part in a direction of movement crossing the X-rays emitted toward the grating part,
the grating part includes N (2≤N) regions arranged in a direction along the direction of movement by the moving mechanism,
a cyclic direction of a grating structure in each of the plurality of gratings belonging to an ith (1≤i≤N−1) region out of the N regions and a cyclic direction of a grating structure in each of the plurality of gratings belonging to an (i+1)th region out of the N regions are different directions, and
the plurality of gratings are configured so that moiré interference fringes generated in each of all the N regions have a cyclic intensity fluctuation measurable by the detector and have a cyclic intensity fluctuation of at least one cycle or more in the direction of movement by the moving mechanism, wherein
the plurality of gratings include a G1 grating and a G2 grating constituting the Talbot interferometer, and
cyclic directions in the N regions of the G2 grating are set to uniformly rotate at an angle θ (θ≠0) with respect to a self-image, generated by the G1 grating of the grating part and having N cyclic directions, to generate the moiré interference fringes, and wherein
the angle θ satisfies the following range in all the N regions:

$$\frac{d}{l_i \cos\psi_i} < |\theta| < \frac{d}{3p\cos\psi_i} \tag{1}$$

where
- d is a grating cycle of the G2 grating;
- $l_i$, is a width of an image detection region on the detector in the direction of movement of the object in the ith region out of the N regions;
- $\Psi_i$ is an angle in the cyclic direction in the self-image generated by the G1 grating in which a direction parallel to the direction of movement of the object is assumed to be 0°) in the ith region out of the N regions; and
- p is a pixel size of the detector.

2. The X-ray image generation device according to claim 1 wherein the width h of the image detection region satisfies the following range in all the N regions:

$$l_i = L \frac{\frac{1}{\cos\psi_i}}{\sum_{i=1}^{N} \frac{1}{\cos\psi_i}} \quad (3)$$

where L is a total width of the image detection region on the detector in the direction of movement of the object for all the N regions.

3. The X-ray image generation device according to claim 1, wherein each of the plurality of gratings has the grating structure in different cyclic directions formed on one substrate.

4. The X-ray image generation device according to claim 1, wherein the plurality of gratings further include a G0 grating constituting a Talbot-Lau interferometer.

5. The X-ray image generation device according to claim 1, further comprising a processing unit, wherein:
- the processing unit includes an X-ray image generation unit and an artifact processing unit,
- the X-ray image generation unit is configured to generate an X-ray image by using a plurality of intensity distribution images acquired by the detector, and
- the artifact processing unit is configured to remove an artifact in the X-ray image by using a region of interest (ROI) image in a region where there is no object in the X-ray image.

* * * * *